United States Patent [19]
Klomp et al.

[11] Patent Number: 4,993,373
[45] Date of Patent: Feb. 19, 1991

[54] SEALING SHROUD PORT TIMING VALVE FOR TWO CYCLE ENGINE

[75] Inventors: Edward D. Klomp, Mount Clemens; Edward G. Groff, Troy; Donald T. French, Warren; Paul M. Heck, Utica, all of Mich.

[73] Assignee: General Motors Corporation, Detroit, Mich.

[21] Appl. No.: 480,176

[22] Filed: Feb. 14, 1990

Related U.S. Application Data

[63] Continuation-in-part of Ser. No. 369,360, Jun. 21, 1989, abandoned.

[51] Int. Cl.⁵ ............................................. F02B 75/02
[52] U.S. Cl. ................................. 123/65 PE; 123/323
[58] Field of Search .............. 123/65 R, 65 PE, 65 V, 123/65 EM, 323

[56] References Cited

U.S. PATENT DOCUMENTS

| | | |
|---|---|---|
| 4,672,925 | 6/1987 | Miyata et al. ................... 123/65 PE |
| 4,776,305 | 10/1988 | Oike .................................. 123/65 PE |

FOREIGN PATENT DOCUMENTS

| | | | |
|---|---|---|---|
| 2599083 | 11/1987 | France . | |
| 60-249615 | 12/1985 | Japan . | |
| 0082224 | 4/1987 | Japan | ............................... 123/65 PE |
| 0189316 | 8/1987 | Japan | ............................... 123/65 PE |
| 0189318 | 8/1987 | Japan | ............................... 123/65 PE |
| 0189322 | 8/1987 | Japan | ............................... 123/65 PE |
| WO83/02800 | 8/1983 | PCT Int'l Appl. . | |

*Primary Examiner*—David A. Okonsky
*Attorney, Agent, or Firm*—Robert J. Outland

[57] ABSTRACT

An exhaust port timing valve for a two cycle engine has a sealing shroud preferably made as a flexible sheet that is urged by gas pressure into sealing contact with a slot and/or sealing edges of an associated exhaust port or shroud to allow low friction valve adjustment while limiting gas leakage past the valve unaffected by close tolerances and temperature changes. Springs and/or seals can alternatively be used with flexible or non-flexible shrouds to improve sealing.

15 Claims, 5 Drawing Sheets

SEALING SHROUD PORT TIMING VALVE FOR TWO CYCLE ENGINE

CROSS-REFERENCE TO RELATED APPLICATION

This application is a continuation-in-part of abandoned U. S. Ser. No. 369,360 filed June 21, 1989, now abandoned.

TECHNICAL FIELD

This invention relates to two-stroke cycle engines herein called two cycle engines and more particularly to exhaust port timing valves for such engines.

BACKGROUND

Experience with ported two cycle engines has shown that an adjustable valve located in the exhaust port very close to the engine cylinder to permit control of the timing of the exhaust event, as shown schematically in FIG. 1, is important to engine part-load performance. However, it is necessary that the sealing clearances be minimized to maximize the advantages of the variable geometry provided by such a valve, since blowdown pressure to which the valve is exposed can produce choked flow. Consequently, large clearances can dissipate much of the anticipated advantages accruing to this variable geometry feature. Unfortunately, small clearances can result in binding as the valve heats up during operation and prevent proper operation.

SUMMARY OF THE INVENTION

The present invention provides exhaust port timing valves for two cycle engines Each of such valves has a shroud preferably made as a flexible sheet that is urged by gas pressure and/or other means into sealing contact with a slot and sealing edges of an associated exhaust port. The flexible or sealed shroud allows low friction valve adjustment while limiting gas leakage past the valve, unaffected by close tolerances and temperature changes.

These and other features and advantages of the invention will be more fully understood from the following description of certain specific embodiments of the invention taken together with the accompanying drawings.

BRIEF DRAWING DESCRIPTION

DETAILED DESCRIPTION

Figure 1:
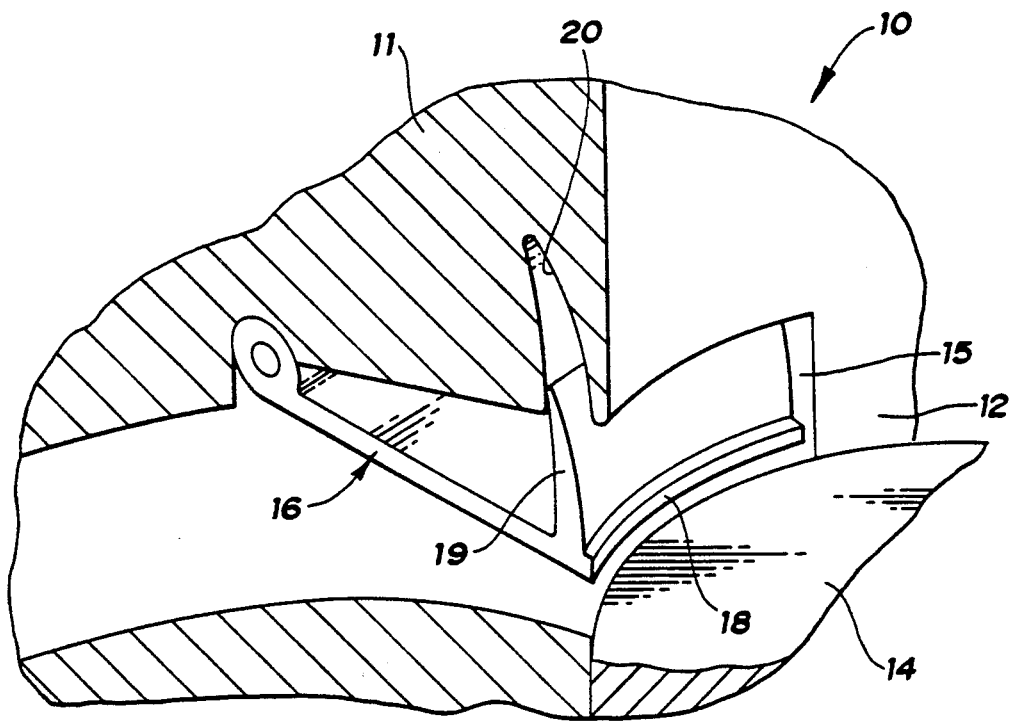
FIG. 1 is a perspective cross-sectional view showing a prior art exhaust port timing valve arrangement for a two cycle engine.

Referring now to the drawings in detail, FIG. 1 illustrates a prior art two cycle engine 10 having a cylinder block 11 with a cylinder 12. A piston 14, reciprocating in the cylinder, opens and closes an exhaust port 15 formed in the block and opening into the cylinder. A timing valve 16, pivotable in the port 15 on a shaft, not shown, has a generally horizontal body (i.e. approximately normal to the cylinder axis, not shown) with a curved edge 18 closely conforming to and generally aligned with the curvature of the cylinder wall. A rigid shroud 19 extends upwardly from the curved edge of the body into a cavity or slot 20 above the port 15.

Movement of the valve body on its pivot shaft raises and/or lowers the curved edge 18 and thereby varies the timing of the exhaust port opening on the piston downstroke as well as its closing on the piston upstroke. The shroud 19 is provided to block the flow of gas between the valve edge 18 and the top of the exhaust port 15. However, clearances between the shroud 19 and the sides of the port 15 and the slot 20, which are required for non-binding operation in view of manufacturing tolerances and operating temperature variations, allow a substantial amount of gas leakage past the shroud in operation and thus provide imperfect sealing.

Figure 2:
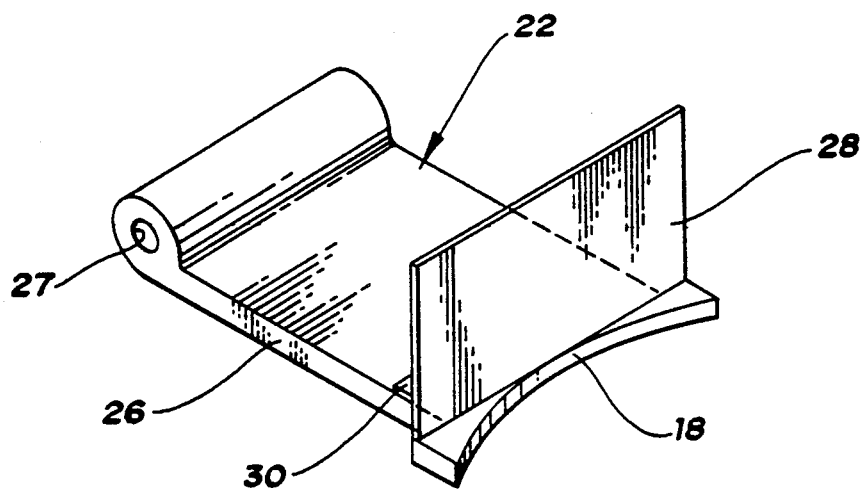
FIG. 2 is a perspective view of a flat shroud form of flexible sheet timing valve according to the invention.
Figure 3:
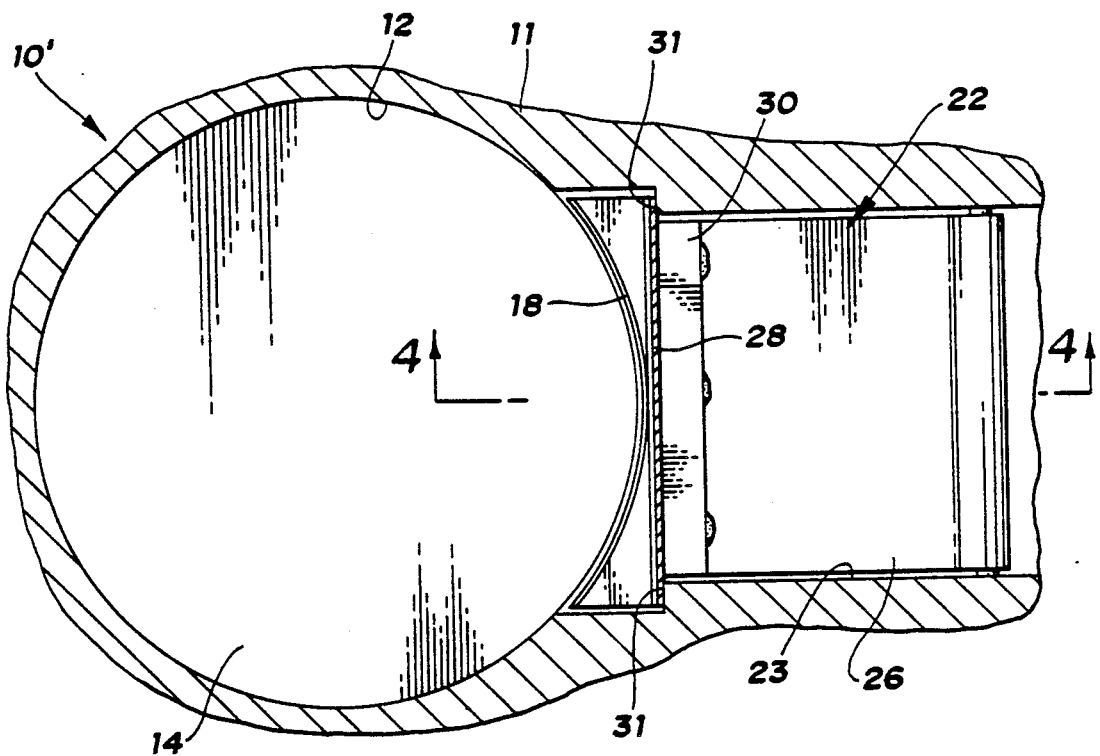
FIG. 3 is a cross-sectional plan view of the flat shroud form of flexible sheet timing valve operatively disposed in the exhaust port of a two cycle engine.
Figure 4:
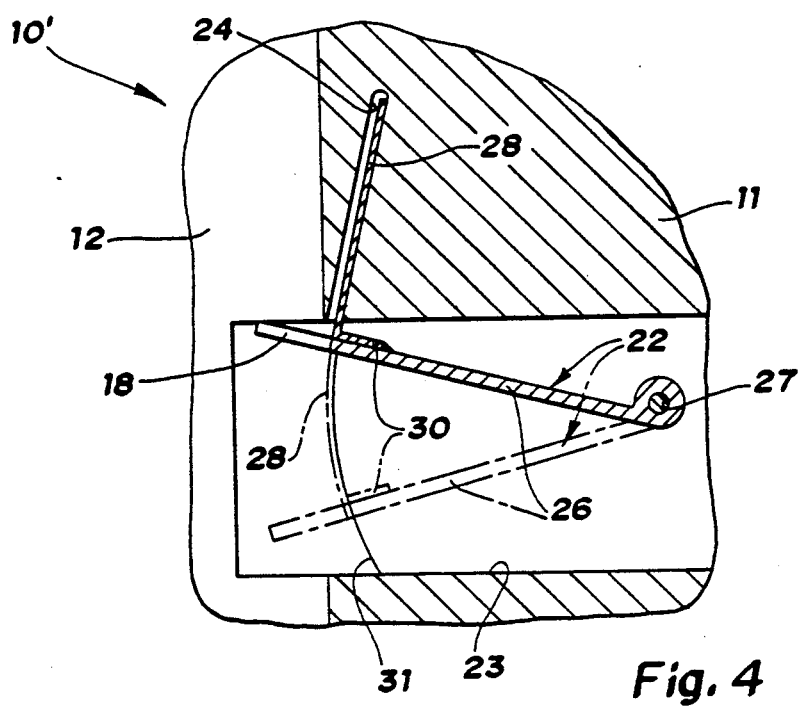
FIG. 4 is a cross-sectional side view from the plane of the line 4—4 of FIG. 3.

FIGS. 2-4 illustrate an embodiment of the present invention providing one solution to the sealing problem. The construction of the engine 10, is largely the same as in the prior art embodiment of FIG. 1 so that like numerals are used for like parts. There are differences, however, in the construction of the valve 22, the exhaust port 23 and the associated cavity or slot 24.

The valve 22 has a rigid body 26 with a pivot shaft opening 27 at one end and a curved edge 18 at the other. A shroud 28, preferably formed of a flexible sheet of high temperature steel, is fixed to the valve body 26 near the curved edge 18 by a bent tab 30 or any other suitable means. Beyond the shroud 28 in the direction of the curved edge 18, the valve body 26 is made slightly wider than the portion of the body 26 and the associated exhaust port 23 extending in the opposite direction toward the pivot opening 27. The port 23 is correspondingly widened to accommodate with close clearance the pivotal motion of the wider body 26, thereby forming curved sealing surfaces 31 facing the cylinder along both sides of the port 23.

The slot 24 in the block extends upward from the upper edges of the sealing surfaces 31 and is about equal in width to the widened portion of the exhaust port 23. Thus, the slot is able to receive the flexible shroud 28 which has a width dimension essentially equal to that of the wider end of the valve body 26. The shroud and the slot have generally planar configurations as viewed from the top so that the shroud 28 is free to flex in the vertical plane as viewed from the side.

In operation, when the valve 22 is in its upper position for early opening and late closing of the exhaust port, the shroud 28 is received within the slot 24 in an essentially flat condition. As the valve 22 is pivoted to its lower positions, the shroud is correspondingly drawn out of the slot and blocks the upper portion of the exhaust port 23 against the passage of gas between the cylinder and the exhaust port above the valve body 26. The cylinder pressure urges the flexible shroud 28 into a curved configuration, bearing against the port sealing surfaces 31 and the adjacent surface of the slot 24 with zero clearance to aid the sealing action. Thus, the only substantial leak paths are between the piston 14 and the curved edge 18 of the valve and through the clearances beside the widened end of the valve body 26. These must be minimized in the same manner as in the prior art construction.

The sliding action of the flexible shroud 28 over the sealing surfaces 31 and the side of the slot 24 allows the valve to be moved without binding while the differential gas pressure assists in maintaining the sealing action. In this way, the leakage of gas past the valve shroud is significantly reduced from the prior art design. If desired, biasing or sealing means such as springs and/or seals could be used to more positively bias the flexible shroud against the associated sealing surfaces 31 and the lower edge of the slot 24.

ADDITIONAL EMBODIMENTS

Figure 5:
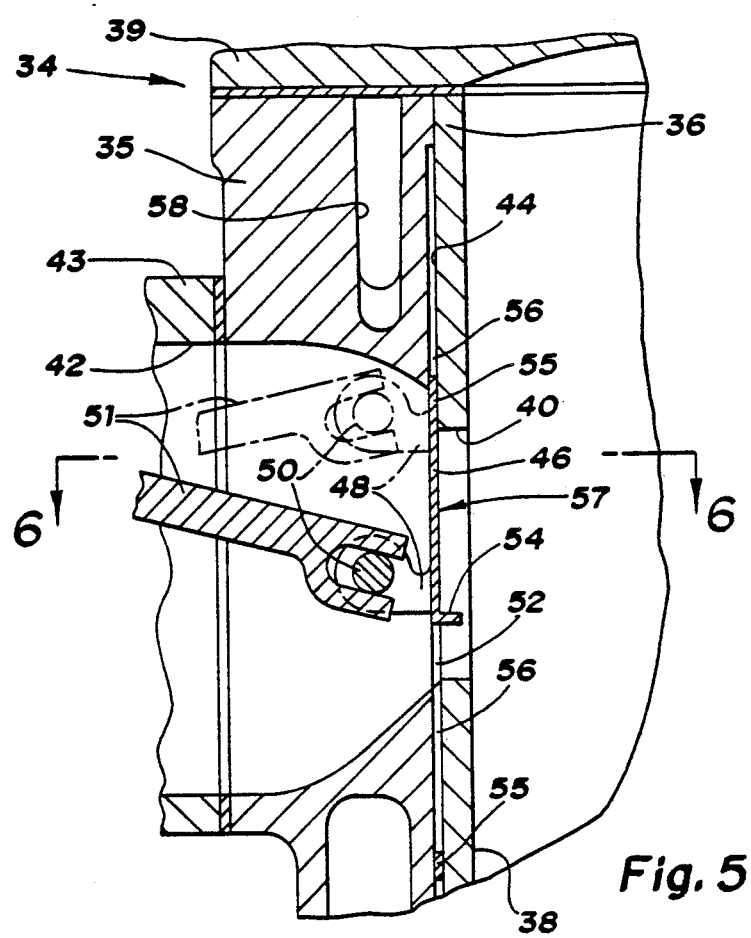
FIG. 5 is a cross-sectional side view of a cylinder curved shroud form of flexible sheet timing valve in an engine exhaust port.
Figure 6:
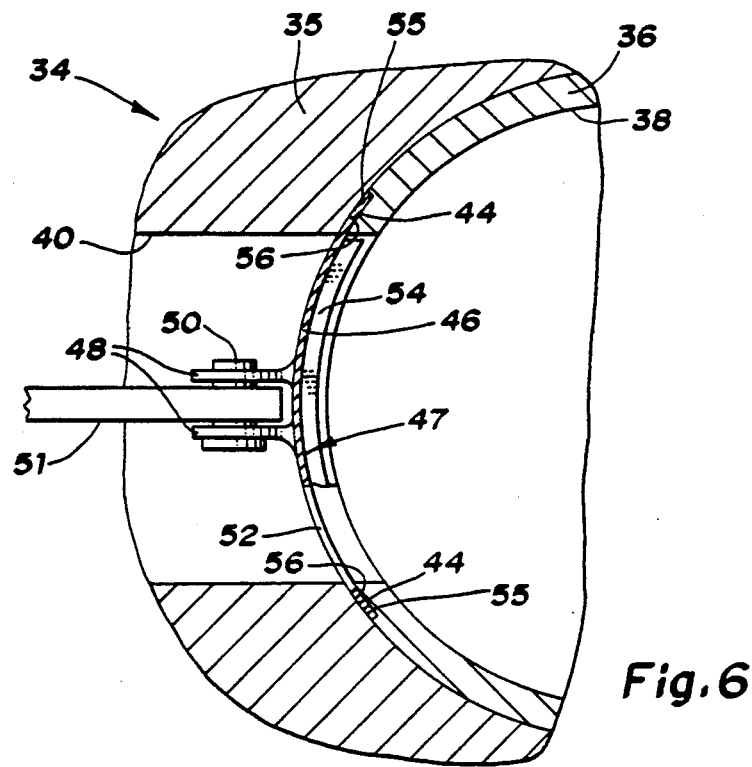
FIG. 6 is a cross-sectional plan view from the plane of the line 6—6 of FIG. 5.

FIGS. 5 and 6 illustrate an alternative embodiment of the invention shown in an engine 34 having a block 35 receiving a plurality of cylinder liners 36 each defining a cylinder 38 and only one of which is shown. One end of each cylinder 38 is closed as by a cylinder head 39 and a piston, not shown, is reciprocably disposed in each cylinder. Each cylinder is provided with an exhaust port 40 that extends through the liner 36 and block 35 to connect with a runner passage 42 in an associated exhaust manifold 43.

Above and below the exhaust port 40 and for a short distance on either side thereof, the liner is recessed (or the block bore could be recessed) to define a slot 44 in which the flexible curved body 46 of a timing valve 47 is received. The body 46 is preferably formed of a resilient high temperature material such as steel, plastic or the like and is curved about the cylinder axis, not shown, so as to fit loosely and be reciprocable within the slot 44. Suitable means such as ears 48 on the body 46 connected by a pin 50 with a pivotable clevis 51 are located in the exhaust port for actuating the valve 47.

A window 52 in the body aligns with the cylinder liner port 40 when the valve is in its full upward position and a lip 54 extends inward from the upper edge of the window to near alignment with the cylinder 12 and close clearance with the piston when it covers the port 40. Peripheral portions 55 of the body extending beyond the port 40 are engagable with the cylinder bore wall of the block (the outside of slot 44) which provide, in effect, sealing surfaces 56 around the port 40.

In operation, the timing of exhaust port opening and closing is variable from the late opening and early closing position shown in solid lines in FIG. 5 to the early opening and late closing position shown in dashed lines wherein the lip 54 is close against the upper edge to the liner port 40. The engagement of the body 46 with the sealing surfaces 56 is encouraged by the cylinder gas pressures and, together with the lip 54 and the solid portion of the body above the window 52, prevents flow from the cylinder 38 to the exhaust system except through the window which lies below the lip 54.

This arrangement has an apparent advantage in flow control since the lip 54 is maintained relatively close to the position of the piston wall at all positions in which the port is closed. However, extension of the slot 44 considerably above and below the port 40 may have adverse effects upon cylinder cooling from the surrounding coolant jacket 58.

Figure 7:
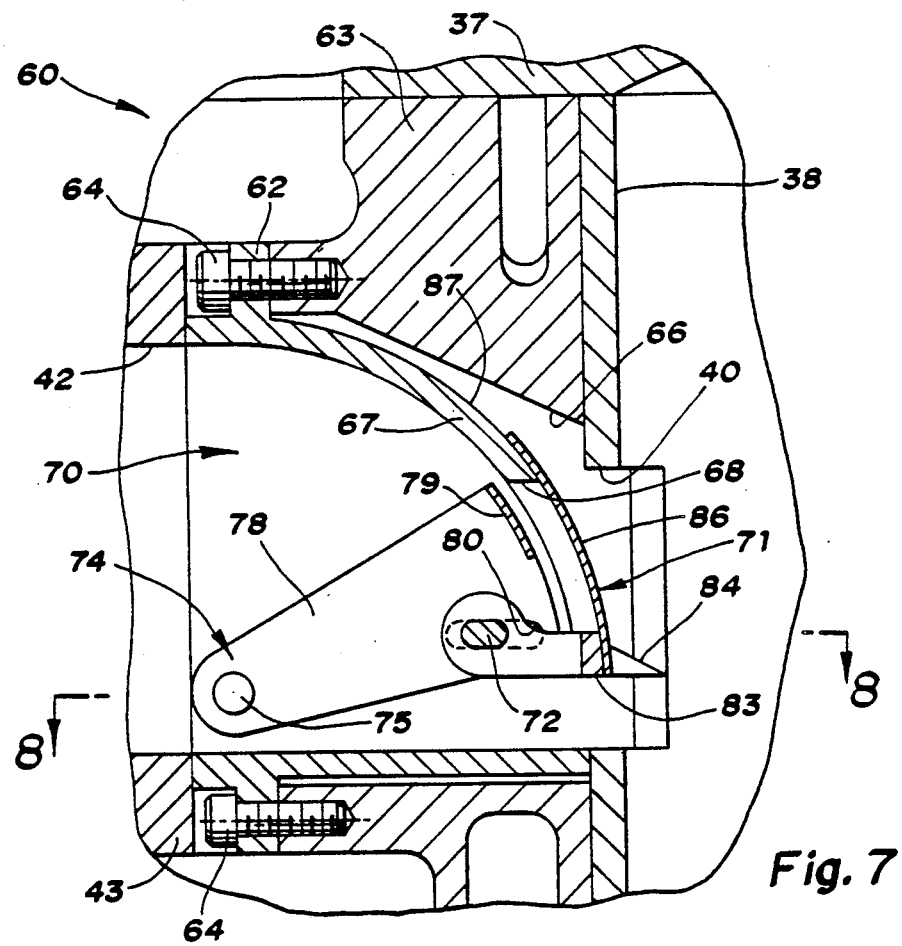
FIG. 7 is a cross-sectional side view of a pivot curved shroud form of flexible sheet timing valve in an engine exhaust port.
Figure 8:
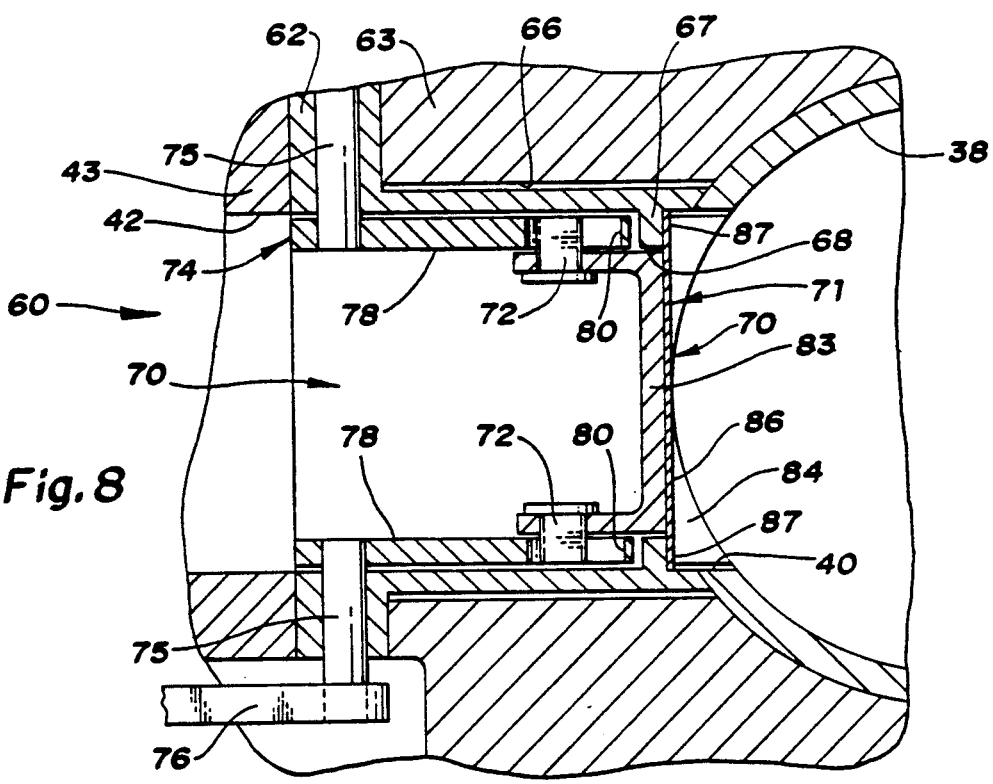
FIG. 8 is a cross-sectional plan view from the plane of the line 8—8 of FIG. 7.

FIGS. 7 and 8 show another alternative embodiment of the invention in an engine 60 having major components similar to the embodiment just described and identified by like numerals. However, engine 60 differs in having a timing valve housing 62 attached to the cylinder block 63 by bolts 64 and extending into a recess 66 thereof adjacent each cylinder exhaust port 40. The extending portions define a part-cylindrical fixed shroud 67 at in each recess 66 having a window 68 therethrough adjacent and aligned with its respective exhaust port 40.

A valve assembly 70 is associated with each port including a valve 71, slide pins 72, carrier 74, pivot shafts 75 and actuating lever 76. The carrier comprises spaced arms 78 connected by a beam 79 and mounted on the pivot shafts 75 for concurrent motion. The shafts 75 are oscillatably carried in the outer portion of the valve housing 62. Near the ends opposite from the pivot shafts, the arms 78 have slots 80 in which the flattened slide pins 72 are slidably received.

The valve 71 is carried on the pins 72 and comprises a rigid body 83 having a curved lip 84 that extends into the cylinder port 40 and approaches close to the position of the piston, not shown, when the piston covers the port. A flexible shroud 86 extends upward from the body 83 inward of the lip 84 to engage the outer sealing surface 87 of the fixed shroud 67 of the valve housing. The flexible shroud 86 is nominally curved about the pivot axis of the shafts 75 and extends with the lip 84 laterally beyond either side of the valve arms 78 to engage the sealing surfaces 87 on either side of the window 68 in the fixed shroud 67.

In operation, the carrier for each of the valves is pivotably movable by actuating the lever 76 to position the valve in any position from the lower position shown in the FIGS. 7, 8 to an upper position where the lip 84 approaches the top of the cylinder port 40. Gas pressure in the cylinder urges the flexible shroud 86 into sealing engagement with the fixed shroud sealing surface 87 to thereby prevent exhaust gases from passing through the port 40 above the lip 84, thus timing the opening and closing points of the port. The sliding action of the pins 72 in the slots 80 allows the valve to adjust its position, allowing the flexible shroud to move freely over the surface 87 while providing a good seal.

Figure 9:
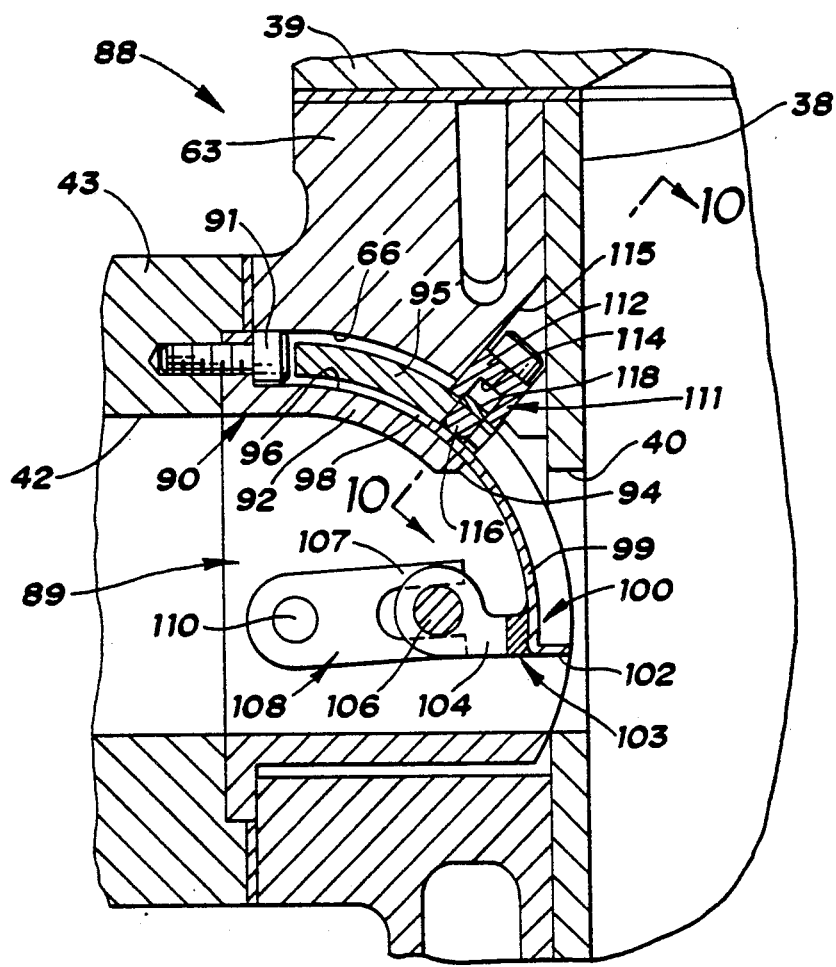
FIG. 9 is a cross-sectional side view of pivot curved shroud form of flexible sheet timing valve with supplemental sealing means in an engine exhaust port.
Figure 10:
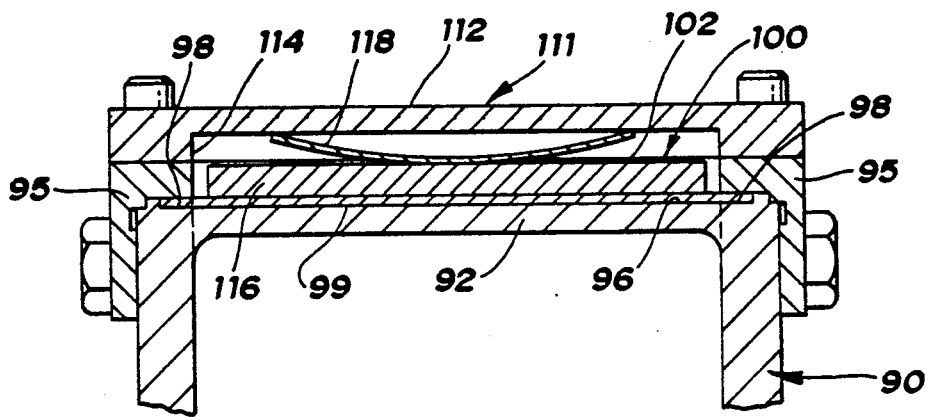
FIG. 10 is a cross-sectional view of the supplemental sealing means from the plane of the line 10—10 of FIG. 9.

FIGS. 9 and 10 show still another embodiment of engine 88 according to the invention and having features similar to those previously described with variations and the addition of supplemental sealing means. Like numerals identify parts similar to those of previously described embodiments. In this engine 88, the exhaust timing valve assembly 89 has a housing 90 secured by bolts 91 to the manifold 43 rather than to the engine block 63. In addition to a fixed shroud 92 having a window 94 aligned with the cylinder port 40, the housing has an outer member 95 spaced from the outer sealing surface 96 and forming a curved slot 98 therebetween.

Within the slot 98 is received the curved flexible shroud 99 portion of a timing valve 100 having a lip 102 formed on the lower edge of the shroud 99. The shroud is attached to a driver 103 having a pair of ears 104 carrying pins 106. The pins are carried in the forked ends 107 of levers 108 which are pivotable on shafts 110 to slide the valve 100 up and down guided by the flexible shroud 99 in the slot 98.

While operating cylinder pressures will urge the flexible shroud 99 toward sealing engagement with the sealing surface 96 of the fixed shroud 92 as earlier described, the engine 88 is provided with a supplemental seal assembly 111 to increase the sealing force. Assembly 111 includes a retainer 112 secured to the valve housing outer member 95 to form therewith a slotted recess 114. An opening 115 in the cylinder block 63 is provided to receive the retainer; however the slotted recess might be otherwise provided, for example, formed within the block.

The recess 114 receives seal bar 116 and a leaf type spring 118 that urges the bar 116 against the flexible shroud 99 to hold it in positive engagement with the sealing surface 96. This provides more positive sealing and allows for the possibility of using a less flexible shroud 99 without limiting the sealing efficiency. If desired, additional spring biased seal bars could be applied along the two edges of the shroud 99 beside the window 94.

It should also be apparent that the bar 116 acts as a spring biased seal against gas flow past the back side of the flexible shroud 99 where it is engaged by the seal 116. Accordingly, if desired, the shroud 99, if part-cylindrical as shown, could be made rigid with clearance from all adjacent surfaces and additional seals could be provided for sealing the various leak paths in the manner of the seal bar 116. Accordingly, the invention contemplates such arrangements in place of or with the flexible shroud means previously described. FIGS. 9 and 10 are considered to alternatively illustrate such an arrangement in a simple form.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

We claim:

1. A timing valve in combination with a two wall of the cylinder and a slot above the exhaust port for receiving a flow blocking shroud, said timing valve including a generally horizontal body disposed in the exhaust port for pivotal motion therein to cause upward and downward travel of a curved edge distal from the pivot and generally conforming to and closely aligned with the cylinder wall, and the shroud extending upwardly from the body and extending into said slot, and the improvement wherein said shroud is formed as a flexible sheet which is responsive to cylinder pressure to sealingly and slidably bear against a side of the slot and against port sealing surfaces provided on edges of the port near and facing toward the cylinder to effectively seal the shroud against the leakage of exhaust gas therepast while allowing adjusting movement of the valve with a limited amount of restraining friction.

2. A timing valve in combination with a two cycle engine having a cylinder, an exhaust port in a wall of the cylinder and a space above the exhaust port for receiving a flow blocking shroud, said timing valve including a generally horizontal lip disposed in the exhaust port for motion therein to cause upward and downward travel of a curved edge generally conforming to and closely aligned with the cylinder wall, and a shroud extending upwardly from the lip and into said space, and the improvement comprising sealing means at the sides of the port and in said space above the port and sealingly engaging the shroud for limiting the passage of exhaust gas through the port above the lip while allowing adjusting movement of the valve with a limited amount of restraining friction.

3. A timing valve as in claim 2 wherein said sealing means includes at least one seal bar biased against said shroud adjacent the port.

4. A timing valve as in claim 2 wherein said sealing means includes sealing surfaces outward of the shroud in the direction of exhaust gas flow and engaged by the shroud.

5. A timing valve as in claim 4 wherein said sealing surfaces are formed on adjacent portions of an associated cylinder block.

6. A timing valve as in claim 4 wherein said sealing surfaces are formed on a fixed shroud portion of a valve housing.

7. A timing valve as in claim 4 wherein said shroud is formed as a flexible sheet which is responsive to cylinder pressure to sealingly and slidably bear against said sealing surfaces.

8. A timing valve as in claim 7 wherein said sealing means further includes biasing means engaging said shroud for urging said shroud against said sealing surfaces.

9. A timing valve as in claim 7 wherein said flexible shroud is normally planar but is deformed into curved configuration to engage curved portions of said sealing surfaces.

10. A timing valve as in claim 4 wherein said shroud is of part-cylindrical configuration and is slidable on sealing surfaces which are correspondingly shaped and coaxial with the associated cylinder.

11. A timing valve as in claim 4 wherein said shroud is of part-cylindrical configuration and is slidable on correspondingly shaped sealing surfaces.

12. A timing valve as in claim 4 wherein said shroud is centered on a pivot axis of associated valve actuating means.

13. A timing valve as in claim 4 wherein said sealing surfaces are formed on a fixed shroud portion of a valve housing.

14. A timing valve as in claim 13 wherein said valve housing is formed as a separate member and secured to an associated cylinder block.

15. A timing valve as in claim 13 wherein said valve housing is carried on a manifold secured to an associated cylinder block.

* * * * *